Jan. 14, 1958　　　P. S. MACGREGOR　　　2,819,729
PRESSURE RELIEF VALVES FOR FUEL TANKS

Filed Nov. 15, 1954　　　　　　　　　3 Sheets-Sheet 1

INVENTOR
PETER S. MacGREGOR

By Watson, Cole, Grindle & Watson
ATTYS

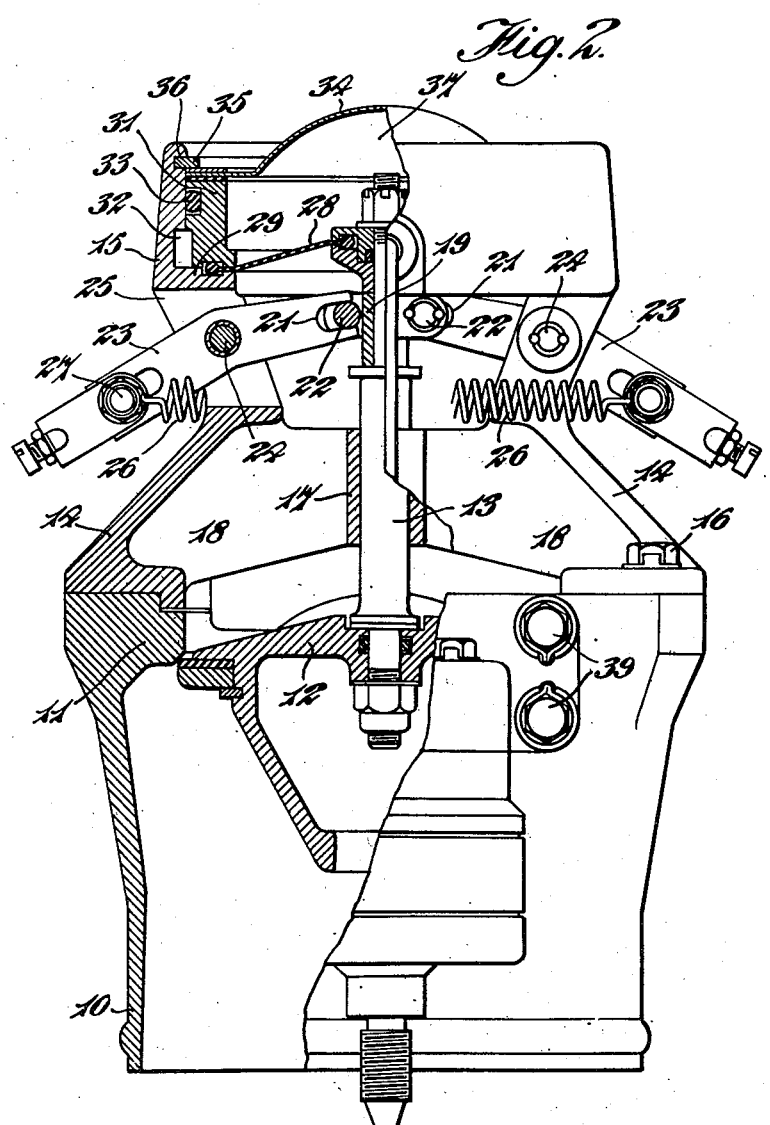

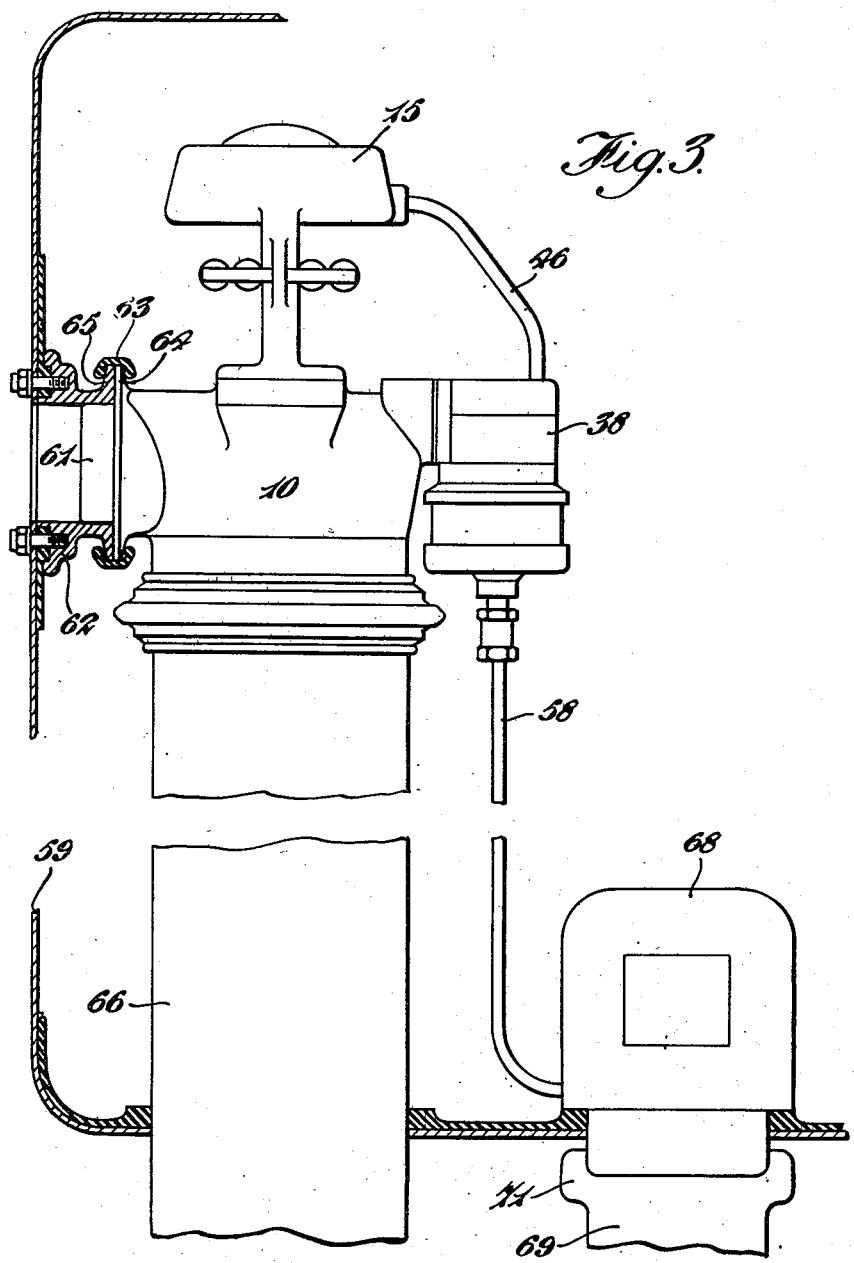

United States Patent Office 2,819,729
Patented Jan. 14, 1958

2,819,729

PRESSURE RELIEF VALVES FOR FUEL TANKS

Peter S. Macgregor, Upton, Poole, England, assignor to Flight Refueling Incorporated, Baltimore, Md., a corporation Application November 15, 1954, Serial No. 468,951

Claims priority, application Great Britain November 20, 1953

7 Claims. (Cl. 137—529)

This invention relates to pressure relief valves for fuel tanks of aircraft in which fuel is stored under a pressure greater than atmospheric pressure. Pressure relief valves are provided in such fuel tanks to ensure that, during refuelling, when fuel is being pumped into the tanks under pressure, the pressure cannot rise to a value sufficient to damage the tanks. It is convenient, however, to place such relief valves in positions such that, due to acceleration and other forces, local pressures are at times generated in the vicinity of the valves which are higher than could be withstood by the tank as a whole, and it is therefore desirable that such valves, when refuelling is not actually being carried out, should withstand a pressure higher than that at which they are set to open during refuelling.

The object of the present invention is to provide an improved pressure relief valve which is adapted to open at either of two different pressures.

According to the invention, a relief valve for the purpose set forth comprises a valve closure member on which pressure in the tank acts to open the valve and resilient means urging the valve to a closed position, in combination with tank pressure responsive means which act on the valve closure member, the application of pressure to said pressure responsive means being so controlled that the resultant force produced by a given pressure in the tank and tending to open the valve is increased during a refuelling operation.

The pressure responsive means preferably comprise a diaphragm or other deformable or movable wall on one side of which the tank pressure acts constantly in a direction to close the valve, the opposite side of the diaphragm or equivalent being normally subjected to atmospheric pressure, but being subjected to the pressure in the tank during a refuelling operation.

The side of the diaphragm or equivalent on which the pressure acts to open the valve may form a wall of a chamber arranged for selective connection to the atmosphere or to the tank through valve means controlled by the pressure of fuel being supplied to the tank.

The invention is hereinafter described with reference to the accompanying drawings, in which:

Figure 2 is a view looking from the right-hand side of Figure 1, one half of the relief valve being shown in section on the line 2—2 of Figure 1; and Figure 3 is a diagrammatic view showing the relief valve installed in a fuel tank.

Figure 1:
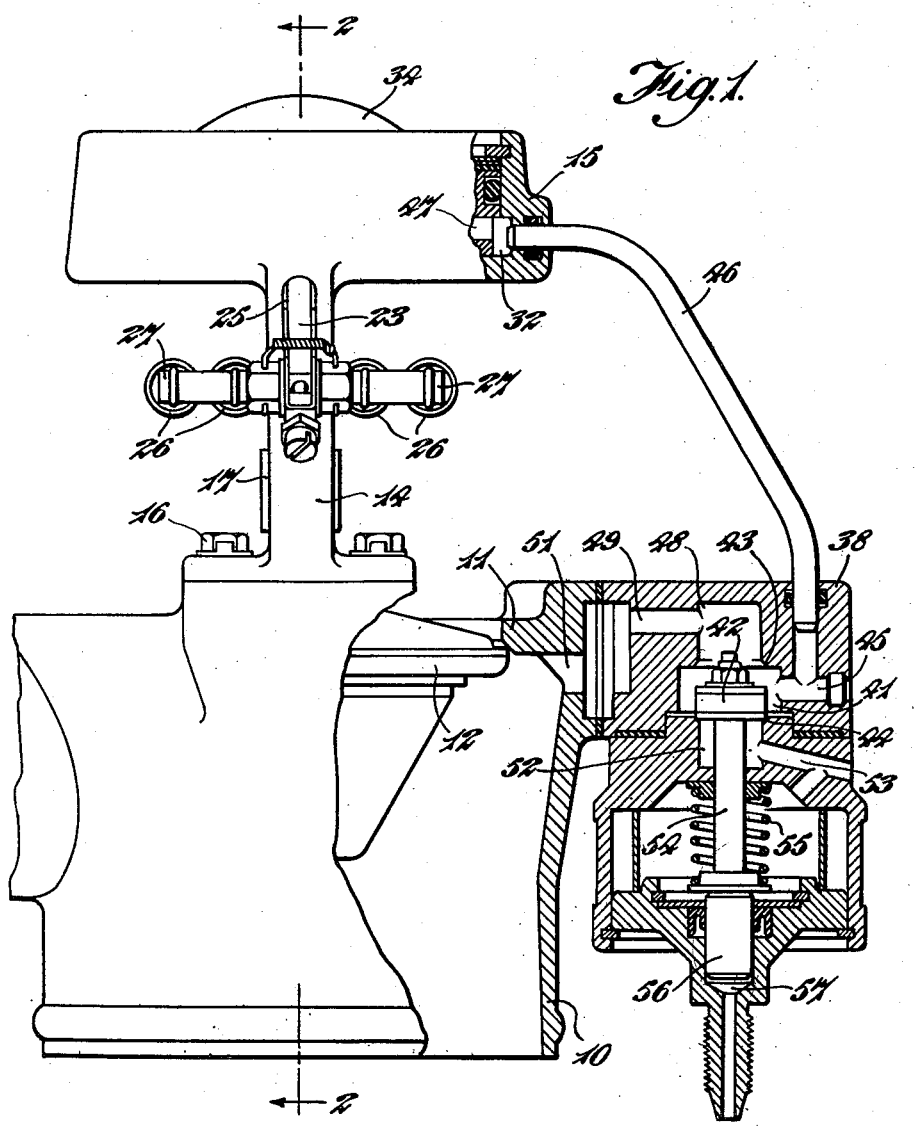
Figure 1 is an elevation, with parts in section, of one form of relief valve according to the invention, showing the manner in which the valve is mounted in a fuel tank.

Referring to Figures 1 and 2 of the drawings, the valve comprises a tubular body 10 having an inwardly directed flange 11 at one end, the edge of the flange 11 providing a seat for a valve closure member 12 mounted on a stem 13. A pair of diametrically opposed legs 14, 14 integral with a ring 15 of L-shaped cross section, are secured by bolts 16 to the body 10 so that the ring 15 occupies a position concentric with the body 10 and spaced from the end of the said body at which the flange 11 is located. The valve stem 13 is slidable in a guide 17 integral with webs 18 extending inwardly from the legs 14, 14, and has mounted on it a member 19 provided with spaced pairs of lugs 21. Two pins 22 extend one between each pair of lugs 21, the pins 22 lying in a common plane perpendicular to the axis of the valve, and two levers 23 pivotally mounted at 24 in slots 25 in the legs 14, have notched inner ends engaging the pins 22. The levers 23 are so arranged that their outer ends are nearer to the valve closure member than are their inner ends, and springs 26 extending between laterally projecting mounting pins 27 at the said outer ends of the levers thus urge the valve closure member on to its seat.

To the free end of the stem 13 is clamped the centre of a flexible diaphragm 28, the outer edge of the diaphragm being clamped between the radial flange 29 of the ring 15 and a second ring 31 mounted inside the ring 15. The two rings 15 and 31 are so shaped as to define an annular channel 32 between them, a packing ring 33 being provided to render the said channel fluid-tight, and a rigid cover plate 34, held in position on the top of the ring 29 by a resilient ring 35 engaging an internal groove 36 in the ring 15, defines with the diaphragm 28 a closed chamber 37.

A housing 38 secured to the exterior of the valve body 10 by bolts 39 includes a valve chamber 41 in which is located a valve head 42 movable to engage with either of two seats 43 and 44 at opposite sides of the chamber 41. A passage 45 leading radially from the valve chamber 41 is connected by a conduit 46 to the annular channel 32, which is in turn connected by a passage 47 in the ring 31 to the closed chamber 37. A recess 48 the mouth of which defines the valve seat 43 is connected by passages 49 and 51 in the housing 38 and valve body 10 respectively to the interior of the valve body 10, and a recess 52 the mouth of which defines the valve seat 44 is connected by a passage 53 to the interior of the tank in which the relief valve is mounted.

The valve head 42 is mounted on a stem 54, and is urged by a spring 55 acting on the said stem towards the seat 44. A plunger 56, slidable in a cylinder 57 formed in the housing 38 engages the end of the valve stem, and the said plunger 56 is movable by liquid under pressure acting in the cylinder 57 to displace the valve head into engagement with the seat 43. Liquid under pressure is supplied to the cylinder 57 through a pipe 58.

The valve body 10 is mounted inside a fuel tank 59 (Figures 1 and 3), a cylindrical projection 61 on the body being inserted into a ring 62 secured to the tank wall, and the body secured to the said ring 62 by a clamp ring 63 of channel section engaging flanges 64 and 65 on the body and ring respectively. A tube 66 connected in a fluid tight manner to the body 10 passes through the bottom of the tank 59 to carry away liquid which passes through the relief valve. An inlet valve through which liquid fuel is supplied to the tank is shown diagrammatically at 68, and a supply hose 69 is shown connected to it by a coupling 71. The pipe 58 leads into the housing of the inlet valve 68 on the upstream side of the valve closure member therein.

When no fuel is being supplied to the tank, there is no pressure acting in the pipe 58 and cylinder 57, so the valve head 42 is held by the spring 55 against the seat 44, and the closed chamber 37, is in communication, through the passage 47, channel 32, conduit 46, passage 45, recess 48 and passages 49 and 51 with the interior of the valve body 10, in which the pressure is atmospheric. The diaphragm 28 is thus subjected to the pressure in the tank, which is super-atmospheric, on its underside, and to atmospheric pressure on its upper side, so that there is a pressure differential acting on the diaphragm and assisting the springs 26 to hold the relief valve closed. When fuel is being supplied to the tank, however, the pressure of the said fuel is transmitted through the pipe 58 to the cylinder 57 and moves the valve head 42 into engagement with the seat 43, so that the chamber 37 is connected through the passage 47, channel 32, conduit 46, passage 45 and passage 53 to the interior of the tank, and the diaphragm 28 is subjected to equal pressures on both sides, so that the springs 26 alone exert a closing force on the valve closure member 12.

Thus the resultant force tending to retain the relief valve closed, at any given tank pressure, is less during a refuelling operation than at other times, and the relief valve will open, during refuelling, under a pressure in the tank which would be insufficient to open it at other times.

It will be understood that the invention is not limited to the particular embodiment described, the construction of the relief valve and the means for changing the resultant valve closing force being capable of modification within the scope of the invention.

The diaphragm 28 may be replaced by a piston or other deformable or movable member.

I claim:

1. In combination with a fuel tank having a fuel supply passage, a pressure relief valve in said tank formed with a discharge port and having a valve element normally closing said port, means in said tank defining an expansible chamber operatively connected to said valve element to control the opening or closing of said port, the exterior of said chamber being exposed to the tank pressure, a control valve alternately operative to establish communication between said chamber and either the tank interior or the atmosphere, resilient means normally positioning said control valve to supply atmospheric pressure to said chamber, and means actuated responsive to the pressure of fluid in said supply passage for positioning said control valve to establish communication between the chamber and the tank interior.

2. The combination of claim 1, including resilient means biasing said valve element toward closed position.

3. In combination with a fuel tank having a fuel supply passage and a discharge passage, a pressure relief valve within said tank controlling and normally closing said discharge passage, means defining an expansible chamber within said tank operatively connected to said valve to control same responsive to differences in pressure within the tank and the chamber, a control valve having opposed ports both communicating with said expansible chamber on their relatively adjacent sides, said ports communicating on their relatively remote sides, respectively, with the atmosphere exteriorly of the tank and with the interior of the tank, a valve element mounted for alternate seating within the respective ports, resilient means normally biasing said element to seating relation with one of said ports and means actuated responsive to the pressure of fuel entering the tank through said supply passage for seating said valve in the other said port.

4. The combination of claim 3 wherein said expansible chamber includes a flexible diaphragm defining one wall thereof, said diaphragm being connected to the relief valve to control the position thereof.

5. The combination of claim 3, including resilient means urging said relief valve toward a position in which it closes said discharge passage.

6. The combination of claim 3 in which said resilient means is associated with the valve element to normally seat same in the port which communicates with the tank interior to permit atmospheric pressure to enter said chamber, the pressure actuated means being operative responsive to the pressure of fluid in said supply passage to seat said valve in the port which communicates with the atmosphere, to thereby permit the interior tank pressure to enter said chamber.

7. In combination with an enclosed fuel tank, a relief valve associated with said tank, means defining a discharge passage for the tank controlled by said valve, said passage communicating with the atmosphere, means defining a pressure chamber including a flexible diaphragm the opposite sides of which are exposed to the pressure within said chamber and the pressure within said tank, respectively, said relief valve being connected to said diaphragm to be opened or closed responsive to differences in pressure on opposite sides of said diaphragm, a control valve having relatively opposed ports both communicating with said pressure chamber, one of said ports communicating also with said discharge passage and the other said port communicating also with the interior of the tank, a valve element mounted for alternate seating in the respective ports, resilient means normally biasing said valve to seating relation with said other port to permit atmospheric pressure from said discharge passage to enter the pressure chamber, and means actuated responsive to the pressure of fluid entering said tank for seating the valve in said one port to permit fluid pressure from the tank to enter said pressure chamber.

No references cited.